(12) United States Patent
Sahu et al.

(10) Patent No.: US 9,926,235 B2
(45) Date of Patent: Mar. 27, 2018

(54) MICROSTRUCTURED CARBONATABLE CALCIUM SILICATE CLINKERS AND METHODS THEREOF

(71) Applicants: Solidia Technologies, Inc., Piscataway, NJ (US); LAFARGE, Paris (FR)

(72) Inventors: Sadananda Sahu, Tallahassee, FL (US); Sean Quinn, North Plainfield, NJ (US); Vahit Atakan, West Windsor, NJ (US); Nicholas DeCristofaro, Chatham, NJ (US); Vincent Meyer, Saint Quentin Fallavier (FR); Cédric Comparet, Saint Quentin Fallavier (FR); Günther Walenta, Saint Quentin Fallavier (FR)

(73) Assignees: Solidia Technologies, Inc., Piscataway, NJ (US); LAFARGE, Paris (FR)

( * ) Notice: Subject to any disclaimer, the term of this patent is extended or adjusted under 35 U.S.C. 154(b) by 0 days.

(21) Appl. No.: 15/074,659

(22) Filed: Mar. 18, 2016

(65) Prior Publication Data
US 2016/0272544 A1 Sep. 22, 2016

Related U.S. Application Data

(60) Provisional application No. 62/136,201, filed on Mar. 20, 2015, provisional application No. 62/136,208, filed on Mar. 20, 2015.

(51) Int. Cl.
| | |
|---|---|
| *C04B 28/24* | (2006.01) |
| *C04B 28/18* | (2006.01) |
| *C04B 35/22* | (2006.01) |
| *C04B 7/345* | (2006.01) |
| *C04B 40/02* | (2006.01) |
| *C04B 35/64* | (2006.01) |

(52) U.S. Cl.
CPC ............. *C04B 28/24* (2013.01); *C04B 7/345* (2013.01); *C04B 28/188* (2013.01); *C04B 35/22* (2013.01); *C04B 35/64* (2013.01); *C04B 40/0231* (2013.01); *C04B 2235/3206* (2013.01); *C04B 2235/3217* (2013.01); *C04B 2235/3272* (2013.01); *C04B 2235/349* (2013.01); *C04B 2235/3418* (2013.01); *C04B 2235/5436* (2013.01); *C04B 2235/80* (2013.01); *Y02P 40/148* (2015.11); *Y02P 40/18* (2015.11); *Y02W 30/92* (2015.05); *Y02W 30/94* (2015.05)

(58) Field of Classification Search
CPC ....... C04B 28/24; C04B 7/345; C04B 28/188; C04B 35/22; C04B 35/64; C04B 40/0231; C04B 2235/3206; C04B 2235/3217; C04B 2235/3272; C04B 2235/3418; C04B 2235/349; C04B 2235/5436; C04B 2235/80; Y02W 30/92; Y02W 30/94; Y02P 40/148; Y02P 40/18

USPC .......................................................... 428/402
See application file for complete search history.

(56) References Cited

U.S. PATENT DOCUMENTS

| | | | | |
|---|---|---|---|---|
| 3,926,647 | A | * 12/1975 | Wuhrer | C01B 33/22 423/331 |
| 3,966,884 | A | * 6/1976 | Jacob | C01B 33/22 220/845 |
| 4,436,498 | A | 3/1984 | Murray | |
| 4,956,321 | A | 9/1990 | Barrall | |
| 8,114,367 | B2 | 2/2012 | Riman et al. | |
| 2005/0284339 | A1 | 12/2005 | Brunton et al. | |
| 2007/0062416 | A1 | 3/2007 | Brzuskiewicz et al. | |
| 2009/0133361 | A1 | 5/2009 | Vera | |
| 2009/0142578 | A1 | 6/2009 | Riman et al. | |
| 2009/0143211 | A1 | 6/2009 | Riman et al. | |
| 2010/0077691 | A1 | 4/2010 | Constantz et al. | |
| 2010/0326328 | A1 | 12/2010 | Constantz et al. | |
| 2011/0067600 | A1 | 3/2011 | Constantz et al. | |
| 2011/0067605 | A1 | 3/2011 | Constantz et al. | |
| 2011/0104469 | A1 | 5/2011 | Riman et al. | |
| 2011/0129407 | A1 | 6/2011 | Riman et al. | |
| 2011/0182799 | A1 | 7/2011 | Riman et al. | |
| 2011/0203489 | A1 | 8/2011 | Constantz et al. | |
| 2011/0290156 | A1 | 12/2011 | Constantz et al. | |
| 2012/0312194 | A1 | 12/2012 | Riman et al. | |
| 2013/0122267 | A1 | 5/2013 | Riman et al. | |
| 2014/0127450 | A1 | 5/2014 | Riman et al. | |
| 2014/0127458 | A1 | 5/2014 | Riman et al. | |

(Continued)

FOREIGN PATENT DOCUMENTS

| | | | |
|---|---|---|---|
| GB | 1174919 | * | 12/1969 |
| GB | 1361713 | * | 7/1974 |

(Continued)

OTHER PUBLICATIONS

PCT/US2014/024987, Int'l Search Report of ISA, dated Aug. 14, 2014.

(Continued)

*Primary Examiner* — Leszek Kiliman
(74) *Attorney, Agent, or Firm* — Milstein Zhang & Wu LLC

(57) ABSTRACT

The invention provides novel, microstructured clinker and cement materials that are characterized by superior grindability and reactivity. The disclosed clinker and cement materials are based on carbonatable calcium silicate and can be made from widely available, low cost raw materials via a process suitable for large-scale production. The method of the invention is flexible in equipment and processing requirements and is readily adaptable to manufacturing facilities of conventional Portland cement.

16 Claims, 14 Drawing Sheets

(56) References Cited

U.S. PATENT DOCUMENTS

| | | |
|---|---|---|
| 2014/0263683 A1 | 9/2014 | Krishnan et al. |
| 2014/0272216 A1 | 9/2014 | Deo et al. |
| 2014/0314990 A1 | 10/2014 | Henn et al. |
| 2014/0322083 A1 | 10/2014 | Kuppler et al. |
| 2014/0342124 A1 | 11/2014 | Zambrzycki et al. |
| 2014/0361471 A1 | 12/2014 | Hu et al. |
| 2014/0363665 A1 | 12/2014 | Kuppler et al. |
| 2015/0056437 A1 | 2/2015 | Deo et al. |
| 2015/0225295 A1 | 8/2015 | McCandlish et al. |
| 2015/0266778 A1 | 9/2015 | Riman et al. |
| 2015/0336852 A1 | 11/2015 | Patten et al. |
| 2016/0031757 A1 | 2/2016 | Atakan et al. |
| 2016/0096773 A1 | 4/2016 | Quinn et al. |
| 2016/0168720 A1 | 6/2016 | Jain et al. |

FOREIGN PATENT DOCUMENTS

| | | | |
|---|---|---|---|
| WO | 2009/103885 A2 | | 8/2009 |
| WO | WO2009/132692 | * | 11/2009 |
| WO | 2009/102360 A2 | | 1/2010 |
| WO | 2011/053598 A2 | | 5/2011 |
| WO | 2011/090967 A2 | | 7/2011 |
| WO | 2012/122031 A2 | | 9/2012 |
| WO | 2014/159832 A2 | | 10/2014 |
| WO | 2014/160168 A2 | | 10/2014 |
| WO | 2014/165252 A2 | | 10/2014 |
| WO | 2014/165257 A2 | | 10/2014 |
| WO | 2014/197532 A2 | | 12/2014 |
| WO | 2014/197545 A2 | | 12/2014 |
| WO | 2015/026900 A2 | | 2/2015 |
| WO | 2015/051243 A2 | | 4/2015 |
| WO | WO2015/090533 | * | 6/2015 |
| WO | 2015/103107 A2 | | 7/2015 |
| WO | 2015/112655 A2 | | 7/2015 |
| WO | 2016/022485 A2 | | 2/2016 |
| WO | 2016/022522 A2 | | 2/2016 |
| WO | WO2016/022485 | * | 2/2016 |
| WO | 2016/054602 A2 | | 4/2016 |

OTHER PUBLICATIONS

PCT/US2014/025278, Int'l Search Report of ISA, dated Aug. 14, 2014.
PCT/US2014/024996, Int'l Search Report of ISA, dated Aug. 21, 2014.
PCT/US2014/025958, Int'l Search Report of ISA, dated Sep. 4, 2014.
PCT/US2014/040816, Int'l Search Report of ISA, dated Oct. 30, 2014.
PCT/US2014/040789, Int'l Search Report of ISA, dated Sep. 30, 2014.
PCT/US2014/059024, Int'l Search Report of ISA, dated Apr. 2, 2015.
PCT/US2014/072494, Int' Search Report and Written Opinion of ISA, dated Jun. 4, 2015.
PCT/US2015/043452, Int' Search Report and Written Opinion of ISA, dated Dec. 17, 2015.
PCT/US2015/043540, Int' Search Report and Written Opinion of ISA, dated Jan. 27, 2016.
PCT/US2016/023181, Int' Search Report and Written Opinion of ISA, dated Jun. 13, 2016.
PCT/US2015/053879, Int' Search Report and Written Opinion of ISA, dated Jan. 28, 2016.
PCT/US2016/023193, Int' Search Report and Written Opinion of ISA, dated Jun. 13, 2016.

* cited by examiner

Silica
Pseudowollastonite
Melilite
Rankinite
Larnite
Brownmillerite
Amorphous 1
Amorphous 2
Porosity

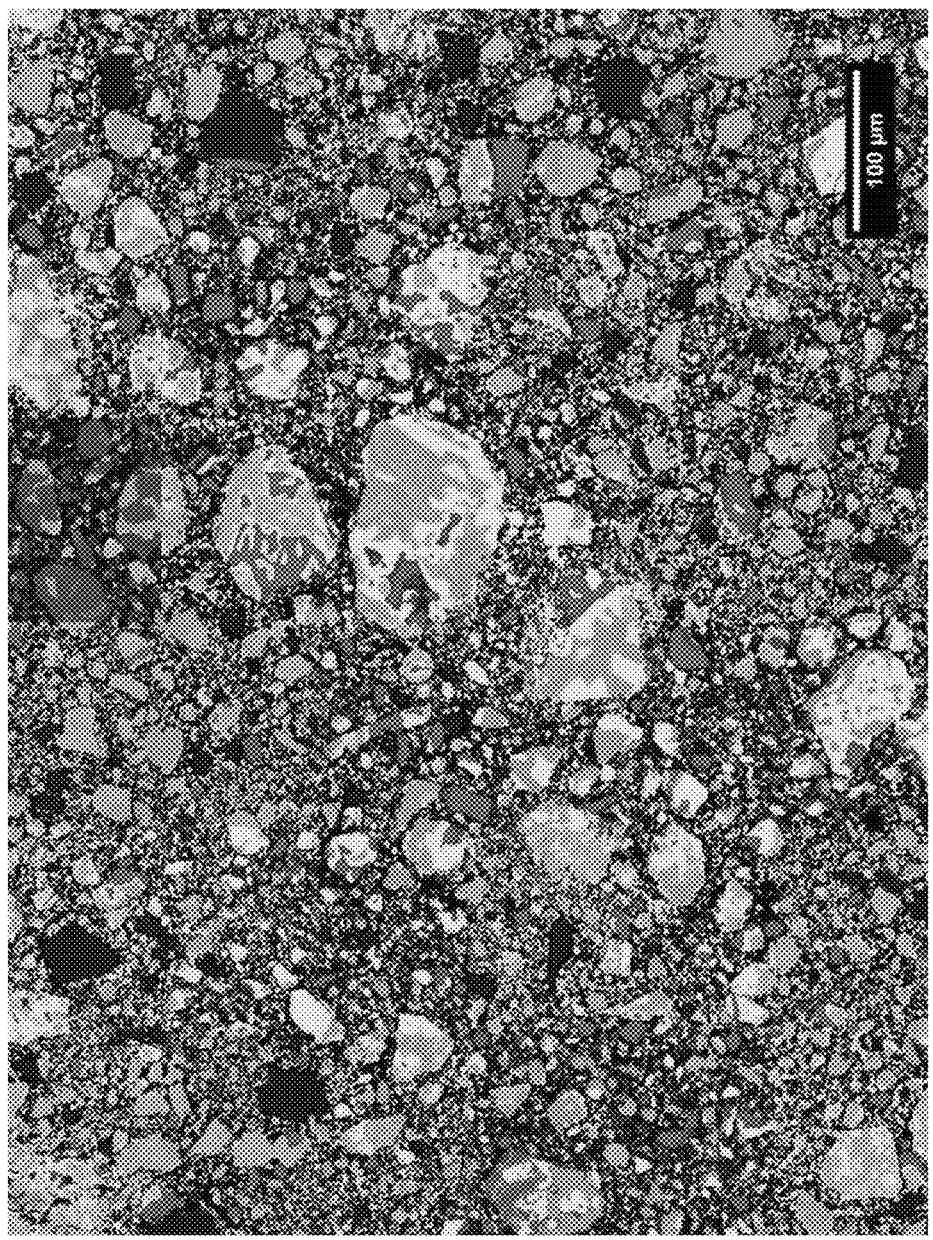
FIG. 8
Silica
Pseudowollastonite
Melilite
Rankinite
Larnite
Brownmillerite
Amorphous 1
Amorphous 2
Porosity
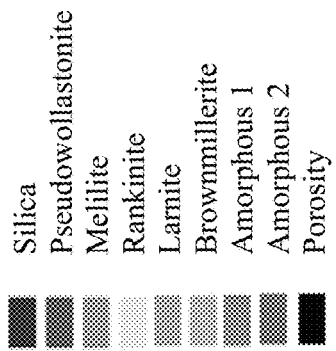

MICROSTRUCTURED CARBONATABLE CALCIUM SILICATE CLINKERS AND METHODS THEREOF

PRIORITY CLAIMS AND RELATED PATENT APPLICATIONS

This application claims the benefit of priority from U.S. Provisional Application Ser. Nos. 62/136,201 and 62/136,208, both filed on Mar. 20, 2015, the entire content of each of which is incorporated herein by reference in its entirety.

FIELD OF THE INVENTION

The invention generally relates to calcium silicate compositions. More particularly, the invention relates to novel microstructured carbonatable calcium silicate compositions (e.g., clinkers, cements), and methods for their manufacture and uses, for example, in a variety of concrete components in the infrastructure, construction, pavement and landscaping industries.

BACKGROUND OF THE INVENTION

Concrete is the most consumed man-made material in the world. A typical concrete is made by mixing Portland cement, water and aggregates such as sand and crushed stone. Portland cement is a synthetic material made by burning a mixture of ground limestone and clay, or materials of similar composition in a rotary kiln at a sintering temperature of 1450° C. Portland cement manufacturing is not only an energy-intensive process, but one which releases considerable quantities of greenhouse gas ($CO_2$). The cement industry accounts for approximately 5% of global anthropogenic $CO_2$ emissions. More than 60% of this $CO_2$ comes from the chemical decomposition, or calcination of limestone.

There has been growing effort to reduce total $CO_2$ emissions within the cement industry. According to a proposal by the International Energy Agency, the cement industry needs to reduce its $CO_2$ emissions from 2.0 Gt in 2007 to 1.55 Gt by 2050. This represents a daunting task because, over this same period, cement production is projected to grow from 2.6 Gt to 4.4 Gt.

To meet this formidable challenge, a revolutionary approach to cement production was developed that significantly reduces the energy requirement and $CO_2$ emissions of a cement plant. The unique cement is comprised of carbonatable calcium silicate compositions and is made from widely available, low cost raw materials and offers the ability to permanently and safely sequester $CO_2$ while being adaptable and flexible in equipment and production requirements, allowing manufacturers of conventional cement to easily convert to the new platform.

"Clinker" refers to lumps or nodules produced by heating in a rotary kiln at high temperature a mixture of raw materials including limestone and alumino-silicate materials such as clay (~1,450° C. in Portland cement). Cement clinker is ground to a fine powder for use in many cement products.

Besides reactivity, clinker grindability is an important measure of the clinker quality. Considerable energy is consumed at a cement plant for clinker grinding. Improved clinker grindability thus increases grinding efficiency and reduces energy consumption. For the carbonatable calcium silicate-based cement production, clinker grindability is an important property. Unlike in the case of Portland cement, grindability of calcium silicate-based clinker is not understood nor is grindability optimization achieved.

Thus, it is important to develop suitable clinker production methodologies that yield favored clinker microstructures and desired grindability profile and reactivity.

SUMMARY OF THE INVENTION

The invention provides a novel, microstructured clinker and cement materials that are characterized by superior grindability and reactivity. The disclosed clinker and cement materials are based on carbonatable calcium silicate and can be made from widely available, low cost raw materials via a process suitable for large-scale production. The method of the invention is flexible in equipment and processing requirements and is readily adaptable at manufacturing facilities of conventional Portland cement.

These disclosed carbonatable calcium silicate clinker and cement compositions can be used in a variety of concrete applications such as in construction, pavements and landscaping, and infrastructure with reduced equipment need, improved energy consumption, and more desirable carbon footprint.

The heterogeneous nature of the microstructures of clinker gives rise to unique clinker grinding properties due to the differences in density and hardness of the various phase regions. Lower density layers act as a path of least resistance for fracture during crushing and grinding operations, resulting in not only reduced energy consumption but also more reactive phases being exposed upon grinding. The layered microstructures may also give rise to particle morphologies that facilitate carbonation and formation of stronger composite materials.

In one aspect, the invention generally relates to a non-hydraulic clinker material, which includes particles of uncarbonatable silica ($SiO_2$) dispersed in a matrix comprising at least one carbonatable calcium silicate phase comprising at least one of wollastonite and pseudowollastonite. As disclosed herein, the clinker material of the invention is carbonatable to yield a composite material via carbonation with $CO_2$.

In another aspect, the invention generally relates to a method for making a clinker material disclosed herein. The method includes: mixing one or more precursors to obtain a blended precursor composition wherein elemental Ca and elemental Si are present at an atomic ratio from about 0.8 to about 1.2 and metal oxides of Al, Fe and Mg are present at about 10% or less by mass; and heating the blended precursor composition to a temperature between about 800° C. and about 1400° C. for a sufficient time to produce the clinker material.

Various raw materials may be used as precursors to produce the clinker material of the invention. For example, suitable raw materials include limestone, sand, silts, sandstones, silica-rich clays, diatomaceous earths, marl, fly ash, silica fume, etc.

In yet another aspect, the invention relates to a powdery material produced by grinding the clinker material of the invention. In certain preferred embodiments, the powdery material is characterized by a mean particle size (d50) of about 8 μm to about 25 μm, with 10% of particles (d10) sized below about 0.1 μm to about 3 μm, and 90% of particles (d90) sized between about 30 μm to about 100 μm.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 8. False color composite micrograph depicting various particles of Experimental Cement 1. Single and multi-phase particles of many compositions are visible.

DETAILED DESCRIPTION OF THE INVENTION

Figure 1:
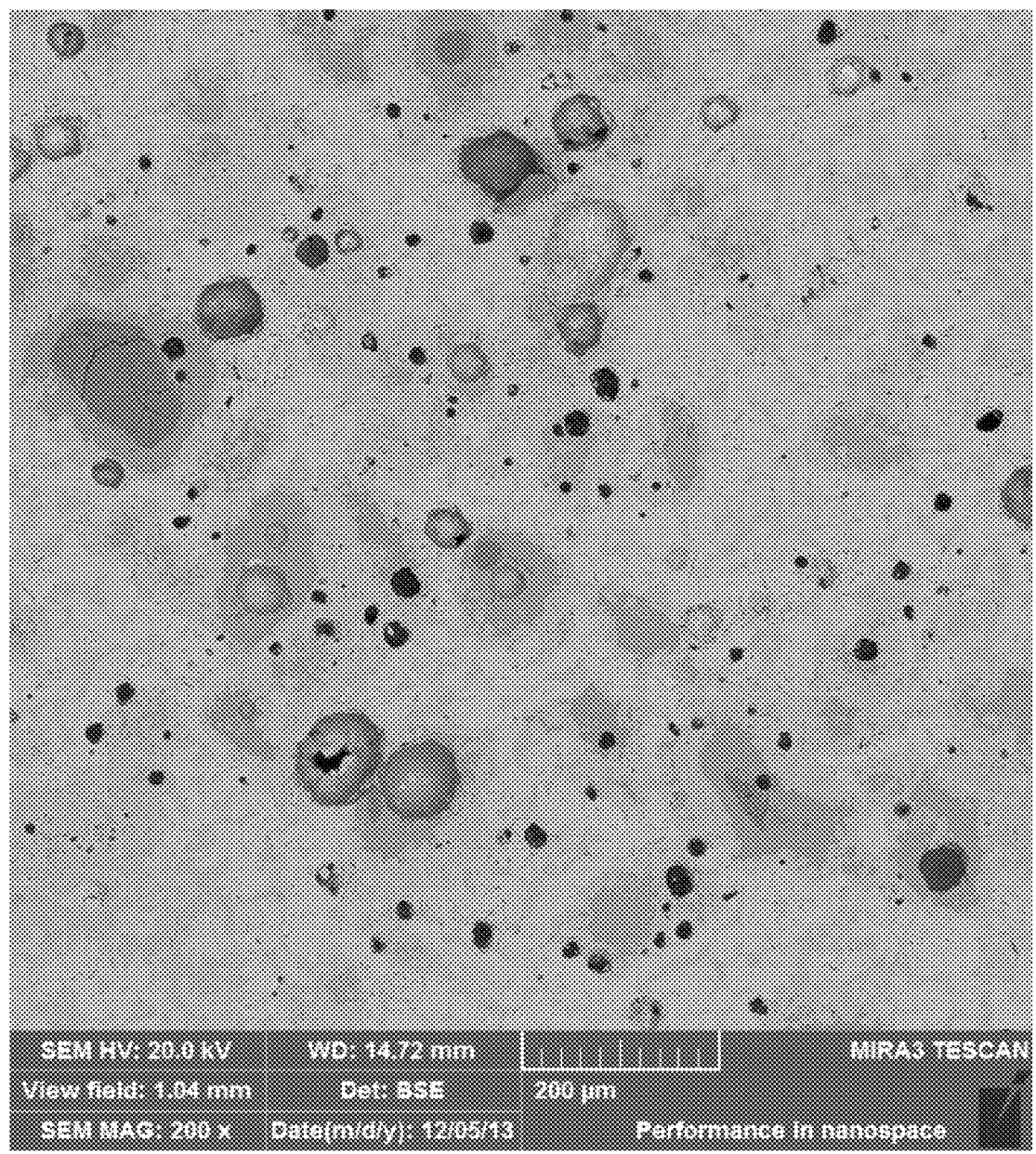
FIG. 1. A backscattered electron (BSE) Image of a cement clinker from Experimental Cement 1. Layers of low brightness unreactive silica banded by progressively brighter reactive phases are visible.

The invention provides a novel carbonatable clinker material based on calcium silicate and a ground powdery composition produced therefrom, which serves as a revolutionary replacement for conventional cements. These materials can be produced and utilized with significantly reduced energy requirement and $CO_2$ emissions. The disclosed carbonatable calcium silicate-based clinker materials are made from widely available, low cost raw materials by a process suitable for large-scale production with flexible equipment and production requirements.

A wide variety of applications can benefit from the invention, from construction, pavements and landscaping, to infrastructure and transportation through improved energy consumption and more desirable carbon footprint.

In one aspect, the invention generally relates to a non-hydraulic clinker material, that includes particles of uncarbonatable silica ($SiO_2$) dispersed in a matrix comprising at least one carbonatable calcium silicate phase comprising at least one of wollastonite and pseudowollastonite, i.e., one or more of CS (wollastonite or pseudowollastonite).

In certain embodiments of the clinker material, the matrix comprises rankinite (C3S2, $Ca_3Si_2O_7$) and/or belite (C2S, $Ca_2SiO_4$). The C2S phase present within the calcium silicate composition may exist in any $\alpha$-$Ca_2SiO_4$, $\beta$-$Ca_2SiO_4$ or $\gamma$-$Ca_2SiO_4$ polymorph or combination thereof.

In certain embodiments, the clinker material further includes an intermediate layer, comprising melilite (($Ca,Na,K)_2(Al,Mg,Fe)[(Al,Si)SiO_7]$) and/or an amorphous phase and surrounding the particles of uncarbonatable silica. The clinker may also include quantities of phases without the ability to significantly carbonate, such as ferrite type minerals (ferrite or brownmillerite or C4AF) with the general formula $Ca_2(Al,Fe^{3+})_2O_5$.

The clinker may also include small or trace (<10% by mass of each phase) quantities of residual CaO (lime) and $SiO_2$ (silica).

The clinker may also include small or trace (<10% by mass) quantities of C3S (alite, $Ca_3SiO_5$).

The metal oxides of Al, Fe and Mg contained within the clinker are generally controlled to be less than about 10% (by total oxide mass) of the total clinker mass. In certain embodiments, the clinker has about 8% or less of metal oxides of Al, Fe and Mg (by total oxide mass) of the total clinker mass. In certain embodiments, the clinker has about 5% or less of metal oxides of Al, Fe and Mg (by total oxide mass) of the total clinker mass. In certain embodiments depending on the application, the clinker may have more than 10% (e.g., about 10% to about 30%) of metal oxides of Al, Fe and Mg (by total oxide mass) of the total clinker mass. In certain embodiments, the clinker has about 30% or less of metal oxides of Al, Fe and Mg (by total oxide mass) of the total clinker mass.

The clinker material may be comprised of one or more of amorphous phases and crystalline phases, which may exist in discrete or joint regions or layers.

The amorphous phase may incorporate Al, Fe and Mg ions and other impurity ions present in the raw materials. In certain embodiments, the clinker's microstructural matrix includes one or more components selected from $Al_2O_3$, $Fe_2O_3$, MgO, $K_2O$ and $Na_2O$. For example, the intermediate layer may include an amorphous phase comprising one or more components selected from $Al_2O_3$, $Fe_2O_3$, MgO, $K_2O$ and $Na_2O$.

The uncarbonatable silica particles may have any suitable morphology and sizes. For example, the uncarbonatable silica particles may have diameters from about 0.1 μm to about 1,000 μm (e.g., about 0.5 μm to about 1,000 μm, about 1.0 μm to about 1,000 μm, about 10 μm to about 1,000 μm, about 25 μm to about 1,000 μm, about 50 μm to about 1,000

μm, about 100 μm to about 1,000 μm, about 0.1 μm to about 500 μm, about 0.1 μm to about 100 μm, about 0.1 μm to about 50 μm, about 1.0 μm to about 500 μm, about 10 μm to about 500 μm, about 25 μm to about 500 μm, about 25 μm to about 200 μm).

The intermediate layer may have any suitable morphology and sizes. For example, the intermediate layer may have a thickness from about 0.1 μm to about 250 μm (e.g., from about 0.5 μm to about 250 μm, from about 1.0 μm to about 250 μm, from about 5.0 μm to about 250 μm, from about 10 μm to about 250 μm, from about 25 μm to about 250 μm, from about 0.1 μm to about 100 μm, from about 0.1 μm to about 50 μm, from about 1.0 μm to about 100 μm, from about 1.0 μm to about 50 μm, from about 1.0 μm to about 25 μm).

In the clinker material, the amorphous phase may account for any suitable percentage, for example, at about 10% or more by volume of the total solid phases (e.g., at about 15% or more, at about 20% or more, at about 25% or more, at about 30% or more, at about 40% or more, at about 45% or more, at about 50% or more, at about 55% or more, at about 60% or more, at about 65% or more, at about 70% or more, at about 75% or more, at about 80% or more by volume of the total solid phases).

In the clinker material, the crystalline phase may account for any suitable percentage, for example, at about 30% or more by volume of the total solid phases (e.g., at about 30% or more, at about 35% or more, at about 40% or more, at about 45% or more, at about 50% or more, at about 55% or more, at about 60% or more, at about 65% or more, at about 70% or more, at about 75% or more, at about 80% or more, at about 85% or more, at about 90% or more, at about 95% or more, by volume of the total solid phases).

In certain preferred embodiments of the clinker material, the atomic ratio of elemental Ca to elemental Si of the calcium silicate composition is from about 0.80 to about 1.20. In certain preferred embodiments, the atomic ratio of Ca to Si of the composition is from about 0.85 to about 1.15. In certain preferred embodiments, the atomic ratio of Ca to Si of the composition is from about 0.90 to about 1.10. In certain preferred embodiments, the atomic ratio of Ca to Si of the composition is from about 0.95 to about 1.05. In certain preferred embodiments, the atomic ratio of Ca to Si of the composition is from about 0.98 to about 1.02. In certain preferred embodiments, the atomic ratio of Ca to Si of the composition is from about 0.99 to about 1.01.

In certain preferred embodiments, the clinker is suitable for carbonation with $CO_2$ at a temperature of about 30° C. to about 90° C. to form $CaCO_3$, under an atmosphere of water and $CO_2$ having a pressure in the range from ambient atmospheric pressure to about 150 psi above ambient and having a $CO_2$ concentration ranging from about 10% to about 99% for about 1 hour to about 150 hours, with a mass gain of about 10% or more. In certain preferred embodiments, the clinker is suitable for carbonation with $CO_2$ at a temperature of about 40° C. to about 80° C. to form $CaCO_3$, under an atmosphere of water and $CO_2$ having a pressure in the range from ambient atmospheric pressure to about 40 psi above ambient and having a $CO_2$ concentration ranging from about 50% to about 95% for about 10 hour to about 50 hours, with a mass gain of about 10% or more, preferably 20% or more. The mass gain reflects the net sequestration of $CO_2$ in the carbonated products. Thus, carbonatation is advantageously performed under an atmosphere of water and $CO_2$. Carbonatation is advantageously performed at a temperature of about 30° C. to about 90° C. to form $CaCO_3$. The pressure may range from ambient atmospheric pressure to about 150 psi above ambient. The $CO_2$ concentration may range from about 10% to about 99%. The carbonatation may last for about 1 hour to about 150 hours. The mass gain is of about 10% or more, preferably 20% or more, or more preferably 30% or more.

In certain preferred embodiments, the composition is suitable for carbonation with $CO_2$ at a temperature of about 30° C. to about 90° C. (e.g., about 40° C. to about 90° C., about 50° C. to about 90° C., about 60° C. to about 90° C., about 30° C. to about 80° C., about 30° C. to about 70° C., about 30° C. to about 60° C., about 40° C. to about 80° C., about 40° C. to about 70° C., about 40° C. to about 60° C.) to form $CaCO_3$ with mass gain of 10% or more (e.g., 15% or more, 20% or more, 25% or more, 30% or more).

It is noted that preferably the carbonatable calcium silicate-based clinker compositions of the invention do not hydrate. However, minor amounts of hydratable calcium silicate phases (e.g., C2S, C3S and CaO) may be present. C2S exhibits slow kinetics of hydration when exposed to water and is quickly converted to $CaCO_3$ during $CO_2$ curing processes. C3S and CaO hydrate quickly upon exposure to water and thus should each be limited to less than about 10% by mass.

As disclosed herein, the clinker material of the invention is carbonatable to yield a composite material via carbonation with $CO_2$. The generation of binding strength is the result of and is controlled by carbonation of various reactive phases in the clinker material when exposed to $CO_2$ under specific curing regimes.

The $CaCO_3$ produced from the $CO_2$ carbonation reactions disclosed herein may exist as one or more of several $CaCO_3$ polymorphs (e.g., calcite, aragonite, and vaterite). The $CaCO_3$ are preferably in the form of calcite but may also be present as aragonite or vaterite or as a combination of two or three of the polymorphs (e.g., calcite/aragonite, calcite/vaterite, aragonite/vaterite or calcite/aragonite/vaterite).

In another aspect, the invention generally relates to a method for making a clinker material disclosed herein. The method includes: mixing one or more precursors to obtain a blended precursor composition wherein elemental Ca and elemental Si are present at an atomic ratio from about 0.8 to about 1.2 and metal oxides of Al, Fe and Mg are present at about 30% or less by mass; and heating the blended precursor composition to a temperature between about 800° C. and about 1400° C. for a sufficient time to produce the clinker material.

Various raw materials may be used as precursors to produce the clinker material of the invention. For example, suitable raw materials include limestone, sand, silts, sandstones, silica-rich clays, diatomaceous earths, marl, fly ash, silica fume, etc.

As disclosed herein, to make the clinker material of the invention, the precursors atomic ratio of elemental Ca to elemental Si of the calcium silicate composition is to be kept at a select range, preferably from about 0.80 to about 1.20 (e.g., from about 0.85 to about 1.15, from about 0.90 to about 1.10, from about 0.95 to about 1.05, from about 0.98 to about 1.02, from about 0.99 to about 1.01).

The blended precursor composition is heated to a temperature and for a sufficient time to produce the clinker material having the microstructure disclosed here. For example, the blended precursor composition is heated to a temperature between about 800° C. and about 1,400° C. (e.g., between about 800° C. and about 1,300° C., between about 800° C. and about 1,200° C., between about 800° C. and about 1,100° C., between about 800° C. and about 1,000° C., between about 900° C. and about 1,400° C., between about 1,000° C. and about 1,400° C., between about 1,100° C. and about 1,400° C., between about 1,200° C. and about 1,400° C., between about 900° C. and about 1,300° C., between about 900° C. and about 1,300° C., between about 1,100° C. and about 1,200° C., between about 1,200° C. and about 1,300° C.).

To produce the clinker material, the blended precursor composition is heated for a period sufficient to achieve the desired microstructure, for example, for a period from about 10 minutes to about 80 hours (e.g., from about 1 hour to about 80 hours, from about 5 hours to about 80 hours, from about 10 hours to about 80 hours, from about 15 hours to about 80 hours, from about 20 hours to about 80 hours, from about 1 hour to about 60 hours, from about 1 hour to about 40 hours, from about 1 hour to about 30 hours, from about 1 hour to about 20 hours, from about 1 hour to about 10 hours, from about 1 hour to about 5 hours, from about 5 hours to about 60 hours, from about 5 hours to about 20 hours, from about 5 hours to about 10 hours, from about 10 minutes to about 5 hours, from about 15 minutes to about 3 hours, from about 20 minutes to about 2 hours).

In preferred embodiments, heating the blended precursor composition is conducted under atmospheric pressure.

In yet another aspect, the invention relates to a powdery material produced by grinding the clinker material of the invention.

In certain preferred embodiments, the powdery material (also referred to as "cement") is comprised of cement particles, which are characterized by a mean particle size (d50) of about 8 μm to about 25 μm, with 10% of particles (d10) sized below about 0.1 μm to about 3 μm, and 90% of particles (d90) sized between about 30 μm to about 100 μm.

In certain embodiments, the ratio of d90:d10 (e.g., a d90:d10 ratio of 30 or higher) is selected to allow improved powder flow or decreased water demand for casting. In certain embodiments, the ratio of d50:d10 (e.g., a d50:d10 ratio of 12 or lower) is selected to allow improved reactivity, improved packing, or decreased water demand for casting. In certain embodiments, the ratio of d90:d50 (e.g., a d50:d10 ratio of 3 or higher) is selected to allow improved the reactivity, improved packing, or decreased water demand for casting.

Cement particles exhibit various microstructures, which may be categorized into two groups: single phase particles and multi-phase particles. Single phase particles may exist in various forms including: (i) reactive (carbonatable) wollastonite ($CaSiO_3$), rankinite ($Ca_3Si_2O_7$) and C2S ($Ca_2SiO_4$); (ii) partially reactive amorphous phases of variable compositions; and (iii) inert (uncarbonatable or insignificant carbonation) phases such as melilite ($(Ca,Na,K)_2$ $[(Mg, Fe^{2+},Fe^{3+},Al,Si)_3O_7]$), ferrite ($Ca_2(Al,Fe^{3+})_2O_7$) and crystalline silica ($SiO_2$).

Multi-phase particles may exist in various forms including: (i) "reactive-reactive", i.e., a combination of two or more reactive phases (e.g., $CaSiO_3$, $Ca_3Si_2O_7$, $Ca_2SiO_3$); (ii) "reactive-inert", i.e., a combination of at least one reactive phase (e.g., $CaSiO_3$, $Ca_3Si_2O_7$, $Ca_2SiO_3$) with at least one inert phase (e.g., $(Ca,Na,K)_2[(Mg, Fe^{2+},Fe^{3+},Al,Si)_3O_7]$, $SiO_2$); (iii) "inert-inert", i.e., a combination of two or more inert phases (e.g., $(Ca,Na,K)_2[(Mg, Fe^{2+},Fe^{3+},Al,Si)_3O_7]$, $SiO_2$); (iv) "reactive-partially reactive", i.e., a combination of at least one reactive phase (e.g., $CaSiO_3$, $Ca_3Si_2O_7$, $Ca_2SiO_3$) with a partially reactive amorphous phase; (v) "inert-partially reactive", i.e., a combination of at least one inert phase (e.g., $(Ca,Na,K)_2[(Mg, Fe^{2+},Fe^{3+},Al,Si)_3O_7]$, $SiO_2$) with a partially reactive amorphous phase; (vi) "reactive-slightly reactive-inert", i.e., a combination of at least one reactive phase (e.g., $CaSiO_3$, $Ca_3Si_2O_7$, $Ca_2SiO_3$) with at least one inert phase (e.g., $(Ca,Na,K)_2[(Mg, Fe^{2+},Fe^{3+}, Al,Si)_3O_7]$, $SiO_2$) and a partially reactive amorphous phase; and (vii) void-containing particles, wherein a particle from one of the categories above that is not fully dense and has internal or surface connected voids.

"Reactive" and "carbonatable" are used interchangeably herein to refer to a material that is reactive with $CO_2$ via a carbonation reaction under a condition disclosed herein. A material is "inert" or "uncarbonatable" if it is unreactive with $CO_2$ via a carbonation reaction under a condition disclosed herein. "Partially reactive" refers to a phase a portion of which is reactive. "Slightly reactive" refers to a phase that is not completely inert but has an insignificant or negligible reactivity. The terms "reactive phase" and "carbonatable phase" are used interchangeably to refer to a material phase that is carbonatable as defined herein. The terms "inert phase" and "uncarbonatable phase" are used interchangeably to refer to a material phase that is uncarbonatable as defined herein. Exemplary carbonatable or reactive phases include CS (wollastonite or pseudowollastonite, and sometimes formulated $CaSiO_3$ or $CaO.SiO_2$), C3S2 (rankinite, and sometimes formulated as $Ca_3Si_2O_7$ or $3CaO.2SiO_2$), C2S (belite, $\beta$-$Ca_2SiO_4$ or larnite, $Ca_7Mg$ $(SiO_4)_4$ or bredigite, $\alpha$-$Ca_2SiO_4$ or $\gamma$-$Ca_2SiO_4$, and sometimes formulated as $Ca_2SiO_4$ or $2CaO.SiO_2$). Amorphous phases can also be carbonatable depending on their compositions. Exemplary uncarbonatable or inert phases include melilite ($(Ca,Na,K)_2[(Mg, Fe^{2+},Fe^{3+},Al,Si)_3O_7]$) and crystalline silica ($SiO_2$).

The powdery material may have any suitable bulk density, for example, a bulk density from about 0.5 g/mL to about 3.5 g/mL (loose, e.g., 0.5 g/mL, 1.0 g/mL, 1.5 g/mL, 2.0 g/mL, 2.5 g/mL, 2.8 g/mL, 3.0 g/mL, 3.5 g/mL) and about 1.0 g/mL to about 1.2 g/mL (tapped), a Blaine surface area from about 150 m²/kg to about 700 m²/kg (e.g., 150 m²/kg, 200 m²/kg, 250 m²/kg, 300 m²/kg, 350 m²/kg, 400 m²/kg, 450 m²/kg, 500 m²/kg, 550 m2/kg, 600 m2/kg, 650 m2/kg, 700 m2/kg).

The powdery material may be produced with a preferred reactivity profile. In certain embodiments, for example, the powdery material is characterized by a surface at least 10% covered with a carbonatable phase. In certain embodiments, the powdery material is characterized by a surface at least 20% covered with a carbonatable phase. In certain embodiments, the powdery material is characterized by a surface at least 30% covered with a carbonatable phase. In certain embodiments, the powdery material is characterized by a surface at least 40% covered with a carbonatable phase. In certain embodiments, the powdery material is characterized by a surface at least 50% covered with a carbonatable phase. In certain embodiments, the powdery material is character-

TABLE 1

Reaction Behavior of Various Phases

| Category | Constituent phases | Reaction behavior |
|---|---|---|
| Reactive | $CaSiO_3$<br>$Ca_3Si_2O_7$<br>$Ca_2SiO_4$<br>$CaO$ | Reacts extensively with $CO_2$. |
| Partially Reactive | Amorphous | Reacts with $CO_2$ to a degree dictated by its composition. |
| Inert | $SiO_2$<br>$Ca_2(Al,Fe^{3+})O_5$<br>$(Ca,Na,K)_2 (Al,Mg,Fe)[(Al,Si)SiO_7]$ | Does not react with $CO_2$ or reacts to an insignificant degree. | ized by a surface at least 60% covered with a carbonatable phase. In certain embodiments, the powdery material is characterized by a surface at least 70% covered with a carbonatable phase. In certain embodiments, for example, the powdery material is characterized by a surface at least 80% covered with a carbonatable phase. In certain embodiments, the powdery material is characterized by a surface at least 90% covered with a carbonatable phase. In certain embodiments, the powdery material is characterized by a surface at least 95% covered with a carbonatable phase. In certain embodiments, the powdery material is characterized by a surface substantially fully covered with a carbonatable phase.

The various reactive (carbonatable) phases may account for any suitable portions of the overall reactive phases. In certain preferred embodiments, the reactive phases of CS are present at about 5 wt % to about 60 wt % (e.g., about 10 wt % to about 60 wt %, about 20 wt % to about 60 wt %, about 25 wt % to about 60 wt %, about 30 wt % to about 60 wt %, about 35 wt % to about 60 wt %, about 40 wt % to about 60 wt %, about 5 wt % to about 50 wt %, about 5 wt % to about 40 wt %, about 5 wt % to about 30 wt %, about 5 wt % to about 25 wt %, about 5 wt % to about 20 wt %); C3S2 in about 5 wt % to 50 wt % (e.g., about 10 wt % to 50 wt %, about 15 wt % to 50 wt %, about 20 wt % to 50 wt %, about 30 wt % to 50 wt %, about 40 wt % to 50 wt %, about 5 wt % to 40 wt %, about 5 wt % to 30 wt %, about 5 wt % to 25 wt %, about 5 wt % to 20 wt %, about 5 wt % to 15 wt %); and C2S in about 5 wt % to 60 wt % (e.g., about 10 wt % to about 60 wt %, about 20 wt % to about 60 wt %, about 25 wt % to about 60 wt %, about 30 wt % to about 60 wt %, about 35 wt % to about 60 wt %, about 40 wt % to about 60 wt %, about 5 wt % to about 50 wt %, about 5 wt % to about 40 wt %, about 5 wt % to about 30 wt %, about 5 wt % to about 25 wt %, about 5 wt % to about 20 wt %, about 5 wt % to about 20 wt %), and C in about 0 wt % to 3 wt % (e.g., 0 wt %, 1 wt % or less, 2 wt % or less, 3 wt % or less, about 1 wt % to 2 wt %, about 1 wt % to 3 wt %, about 2 wt % to 3 wt %).

As used herein, the term "calcium silicate composition" generally refers to naturally-occurring minerals or synthetic materials that are comprised of one or more of a group of calcium silicate phases including CS (wollastonite or pseudowollastonite, and sometimes formulated $CaSiO_3$ or $CaO.SiO_2$), C3S2 (rankinite, and sometimes formulated as $Ca_3Si_2O_7$ or $3CaO.2SiO_2$), C2S (belite, $\beta$-$Ca_2SiO_4$ or larnite, $Ca_7Mg(SiO_4)_4$ or bredigite, $\alpha$-$Ca_2SiO_4$ or $\gamma$-$Ca_2SiO_4$, and sometimes formulated as $Ca_2SiO_4$ or $2CaO.SiO_2$), a calcium-silicate based amorphous phase, each of which material may include one or more other metal ions and oxides (e.g., aluminum, magnesium, iron or manganese oxides), or blends thereof, or may include an amount of magnesium silicate in naturally-occurring or synthetic form(s) ranging from trace amount (1% or less) to about 50% or more by weight.

It should be understood that, calcium silicate compositions, phases and methods disclosed herein can be adopted to use suitable magnesium silicate phases in place of or in addition to calcium silicate phases. As used herein, the term "magnesium silicate" refers to naturally-occurring minerals or synthetic materials that are comprised of one or more of a groups of magnesium-silicon-containing compounds including, for example, $Mg_2SiO_4$ (also known as "forsterite") and $Mg_3Si_4O_{10}(OH)_2$ (also known as "talc"), which material may include one or more other metal ions and oxides (e.g., calcium, aluminum, iron or manganese oxides), or blends thereof, or may include an amount of calcium silicate in naturally-occurring or synthetic form(s) ranging from trace amount (1% or less) to about 50% or more by weight.

A major utility of the clinker material of the invention is that the clinker, usually after being ground into powdery cement, can be carbonated to form composite materials that are useful in a variety of applications. A variety of composite products can be produced by a process that does not require autoclave(s) and is suitable for continuous, large-scale production. The production methods are much improved over conventional concretes in terms of both economics and environmental impact.

The carbonation, for example, may be carried out by reacting the cement of the invention with $CO_2$ via a controlled Hydrothermal Liquid Phase Sintering (HLPS) process to create bonding strength that hold together the various components of the composite material. Discussions of various features of HLPS can be found in U.S. Pat. No. 8,114,367, U.S. Pub. No. US 2009/0143211 (application Ser. No. 12/271,566), U.S. Pub. No. US 2011/0104469 (application Ser. No. 12/984,299), U.S. Pub. No. 2009/0142578 (application Ser. No. 12/271,513), U.S. Pub. No. 2013/0122267 (application Ser. No. 13/411,218), U.S. Pub. No. 2012/0312194 (application Ser. No. 13/491,098), WO 2009/102360 (PCT/US2008/083606), WO 2011/053598 (PCT/US2010/054146), WO 2011/090967 (PCT/US2011/021623), U.S. Provisional Patent Application No. 61/708,423 filed Oct. 1, 2012, and U.S. patent application Ser. Nos. 14/045,758, 14/045,519, 14/045,766, 14/045,540, all filed Oct. 3, 2013, U.S. patent application Ser. Nos. 14/207,413, 14/207,421, filed Mar. 12, 2014, U.S. patent application Ser. Nos. 14/207,920, 14/209,238, filed Mar. 13, 2014, U.S. patent application Ser. Nos. 14/295,601, 14/295,402, filed Jun. 4, 2014, each of which is expressly incorporated herein by reference in its entirety for all purposes.

Any suitable aggregates may be used to form composite materials from the carbonatable composition of the invention, for example, calcium oxide-containing or silica-containing materials. Exemplary aggregates include inert materials such as trap rock, construction sand, pea-gravel. In certain preferred embodiments, lightweight aggregates such as perlite or vermiculite may also be used as aggregates. Materials such as industrial waste materials (e.g., fly ash, slag, silica fume) may also be used as fine fillers.

The plurality of aggregates may have any suitable mean particle size and size distribution. In certain embodiments, the plurality of aggregates has a mean particle size in the range from about 0.25 mm to about 25 mm (e.g., about 5 mm to about 20 mm, about 5 mm to about 18 mm, about 5 mm to about 15 mm, about 5 mm to about 12 mm, about 7 mm to about 20 mm, about 10 mm to about 20 mm, about ⅛", about ¼", about ⅜", about ½", about ¾").

Chemical admixtures may also be included in the composite material, for example, plasticizers, superplasticizers, retarders, accelerators, dispersants and other rheology-modifying agents. Certain commercially available chemical admixtures such as Glenium™ 7500 by BASF® Chemicals and Acumer™ by Dow Chemical Company may also be included. In certain embodiments, one or more pigments may be evenly dispersed or substantially unevenly dispersed in the bonding matrices, depending on the desired composite material. The pigment may be any suitable pigment including, for example, oxides of various metals (e.g., black iron oxide, cobalt oxide and chromium oxide). The pigment may be of any color or colors, for example, selected from black, white, blue, gray, pink, green, red, yellow and brown. The pigment may be present in any suitable amount depending on the desired composite material, for example in an amount ranging from about 0.0% to about 10% by weight of cement.

EXAMPLES

Samples of carbonatable calcium silicate clinkers and cements were embedded in epoxy, polished and coated with carbon to obtain information on the distribution of phases within the clinker or within individual particles. The samples were analyzed by a scanning electron microscope (SEM) in backscattered electron (BSE) imaging mode. The contrast of each phase is related to that phase's stoichiometry, where more dense phases containing high mean atomic number elements will appear more brightly than a less dense phase with a lower mean atomic number. The contrast of the various phases can be related by comparison of the BSE contrast factor η calculated using the mean atomic number $\overline{Z}$ of each phase.

$$\eta = \frac{\ln \overline{Z}}{6} - \frac{1}{4} (\overline{Z} \geq 10)$$ (Equation 1)

The average atomic number $\overline{Z}$ of each phase is the sum of atomic masses of each atom present in the phase divided by the total number of atoms where N is the number of each element of atomic number A and atomic mass Z (ΣNA is the molecular weight).

$$\overline{Z} = \frac{\sum NAZ}{\sum NA}$$ (Equation 2)

The η for the phases present in the cement particles are shown in Table 2. Amorphous phases have a variable chemistry not determined by diffraction. For most cements, the amorphous phase will have a composition similar to the melilite phase. In cements with lower $Al_2O_3$ and MgO content the amorphous phase will have a higher mean atomic number and thus will exhibit a higher brightness in BSE imaging. Phase identities are verified by X-ray microprobe measurement of individual phases.

TABLE 2

Calculated BSE contrast values for the phases present in carbonatable calcium silicate cement particles [a]

| Phase | η |
| --- | --- |
| $SiO_2$ | 0.127 |
| Al - Melilite ($Ca_2Al_2SiO_7$) | 0.154 |
| Mg - Melilite ($Ca_2MgSi_2O_7$) | 0.154 |
| Wollastonite ($CaSiO_3$) | 0.160 |
| Rankinite ($Ca_3Si_2O_7$) | 0.166 |
| Belite ($Ca_2SiO_4$) | 0.171 |

[a] The highest value will correspond to the phase with the highest brightness. The calcium silicate phases have the highest BSE contrast and will be the brightest phases in a BSE image. The darkest areas in an image correspond to pores or voids filled with the carbon based mounting resin.

Figure 2:
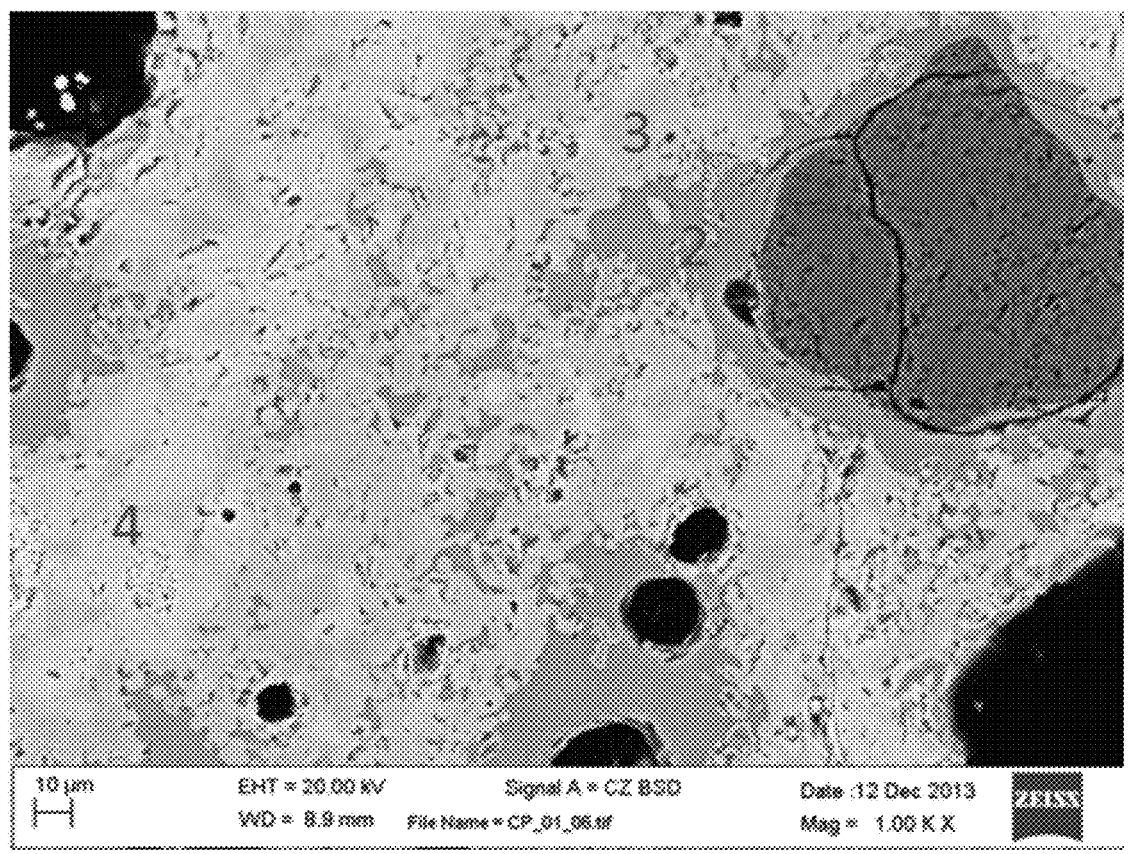
FIG. 2. A backscattered electron (BSE) Image of a cement clinker from Experimental Cement 1. Layers of low brightness unreactive silica banded by progressively brighter reactive phases are visible. Phases were identified by EDS to be silica (1), amorphous phase (2). wollastonite or pseudowollastonite (3) and rankinite (4).
Figure 3:
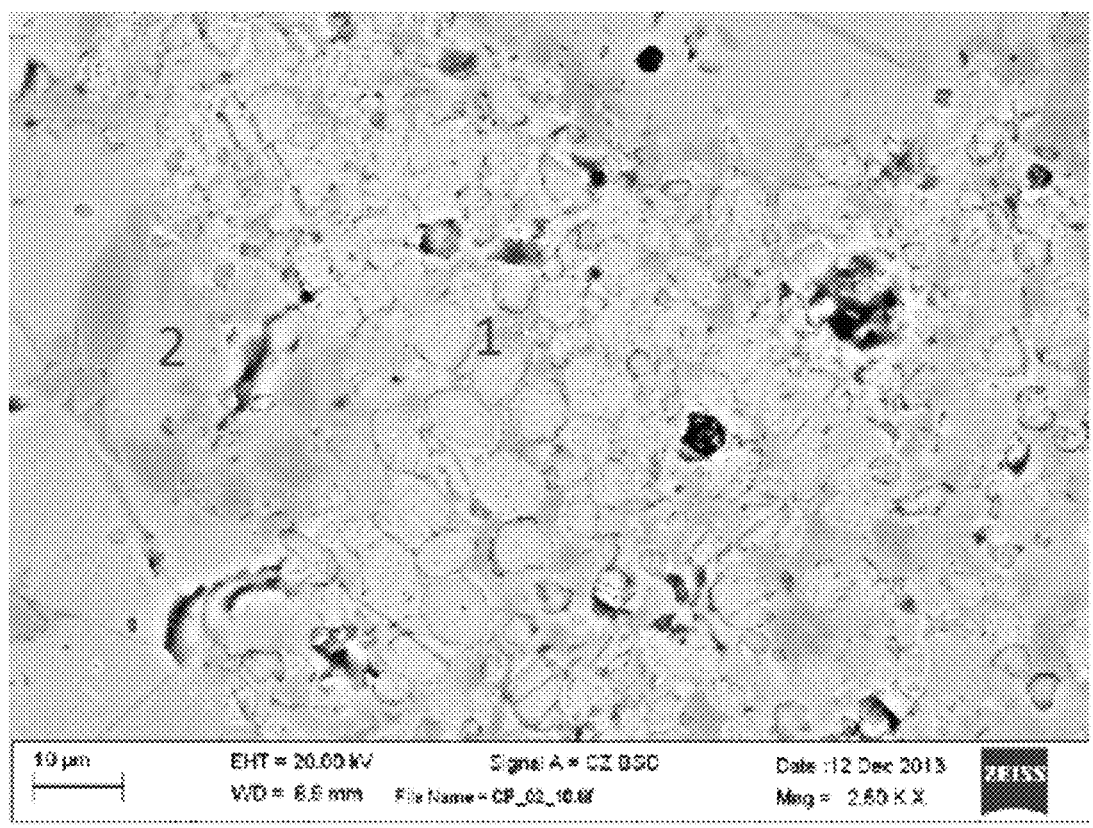
FIG. 3. A high magnification image of a calcium-rich region of cement clinker from Experimental Cement 1. This region contained discrete belite (1) and rankinite (2) regions with some intergranular material with an amorphous composition.

Experimental cements were produced in two separate processes with distinct chemistries. Experimental Cement 1 was produced with limestone and sand ground to fineness of 85% passing 200 mesh. The limestone and sand were blended to obtain a bulk calcium to silicon atomic ratio of approximately 1. The ground and blended raw material was processed in a rotary kiln to a peak temperature of approximately 1200° C. with a residence time of 30 to 60 minutes to react the powder and produce nodules of a sintered carbonatable calcium silicate cement clinker largely composed of carbonatable calcium silicates, melilites, an amorphous phase with a melilite-like composition and unreacted silica. The oxide composition of this cement as determined by X-Ray fluorescence (XRF) is shown in Table 3. The phase composition of this cement as determined by X-Ray diffraction (XRD) is shown in Table 4. A low magnification view of a polished cross section of clinker in FIG. 1 shows discrete regions of low brightness silica surrounded by layers regions with increasing brightness, indicating a concentric organization of high calcium reactive phases around the silica regions. FIG. 2 shows a higher magnification of such a region. FIG. 3 shows a high magnification view of belite regions in a central region far from low calcium phases.

TABLE 3

Oxide composition of Experimental Cement 1 as measured by XRF

| $SiO_2$ | CaO | $Al_2O_3$ | $Fe_2O_3$ | MgO | $SO_3$ | $K_2O$ | $Na_2O$ | $TiO_2$ | $P_2O_5$ | $Mn_2O_3$ |
| --- | --- | --- | --- | --- | --- | --- | --- | --- | --- | --- |
| 44.9% | 43.8% | 5.3% | 1.8% | 1.2% | 0.3% | 2.0% | 0.4% | 0.2% | 0.1% | 0.0% |

TABLE 4

Phase composition of Experimental Cement 1 as measured by XRD

| Wollastonite $CasiO_3$ | Rankinite $Ca_3Si_2O_7$ | Belite $Ca_2SiO_4$ | Amorphous variable | Silica $SiO_2$ | Lime CaO | Melilites variable |
| --- | --- | --- | --- | --- | --- | --- |
| 15% | 19% | 14% | 30% | 5% | 1% | 16% |

Figure 4:
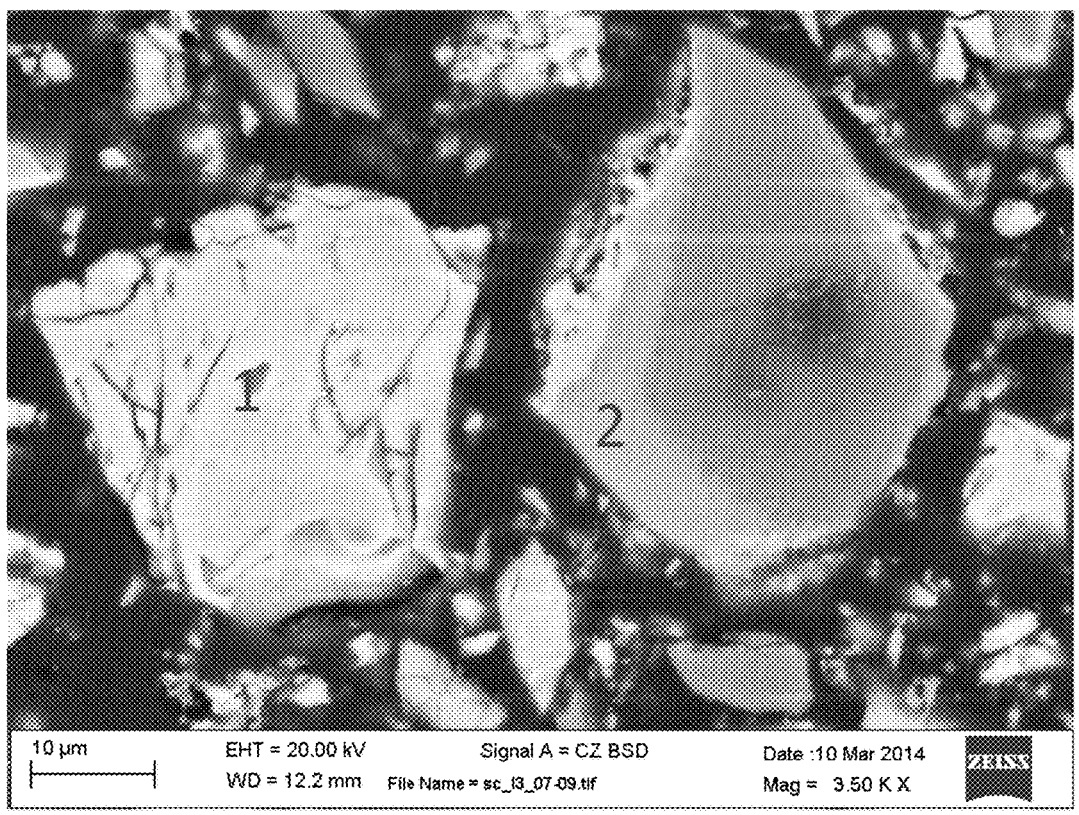
FIG. 4. A backscattered electron (BSE) Image of unreacted cement particles. The image displays a large particle composed of high brightness reactive phases (1). A similarly sized particle shows a distribution of multiple phases with a surface of high brightness reactive material, a band of medium brightness amorphous phases (2) and a core of low brightness $SiO_2$ phase (3). Smaller single-phase particles are also visible.
Figure 5:
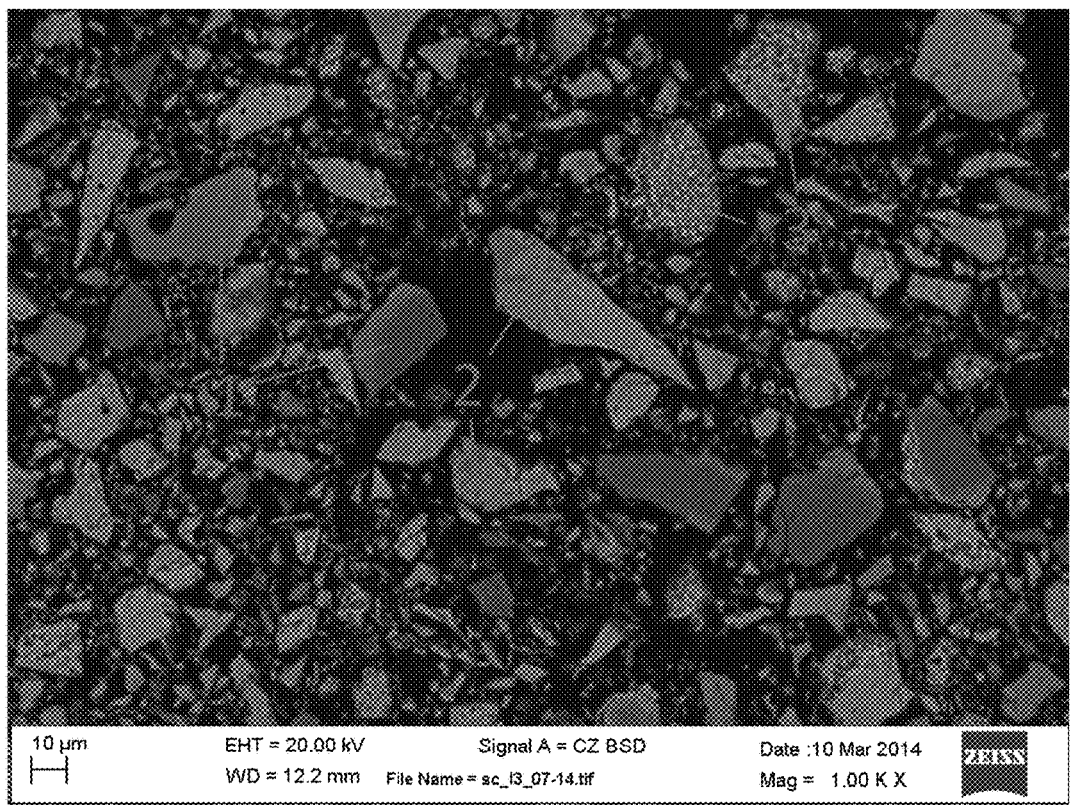
FIG. 5. BSE Image of unreacted cement particles. A large number of particle types are evident. Two phase multi-phase reactive—partially reactive and partially reactive—inert particles (1), three phase reactive—partially reactive—inert (2), and reactive—void (3) particles can be seen.

The cement clinker was then ground using a two-compartment closed circuit ball mill. The material feed rate, ball mill rotation rate and pneumatic separator airflow were controlled to produce a ground cement with a mean particle diameter of 12 μm. BSE images shown in FIG. 4 and FIG. 5 show various single phase and multi-phase particles.

Figure 6:
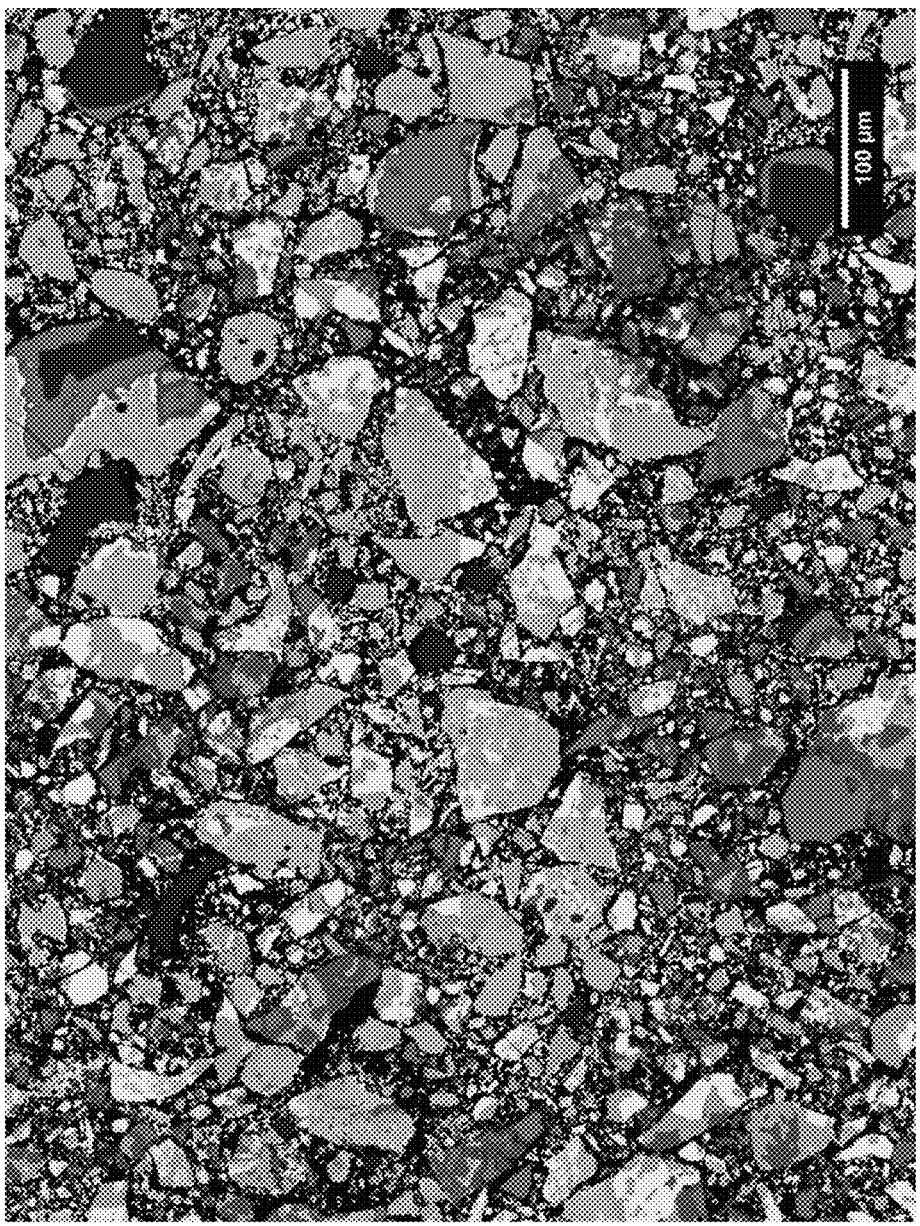
FIG. 6. False color composite micrograph depicting various particles of Experimental Cement 1. Single and multi-phase particles of many compositions are visible.
Figure 6:
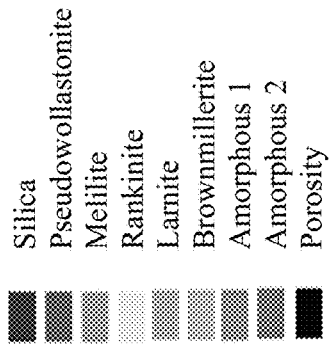
Figure 7:
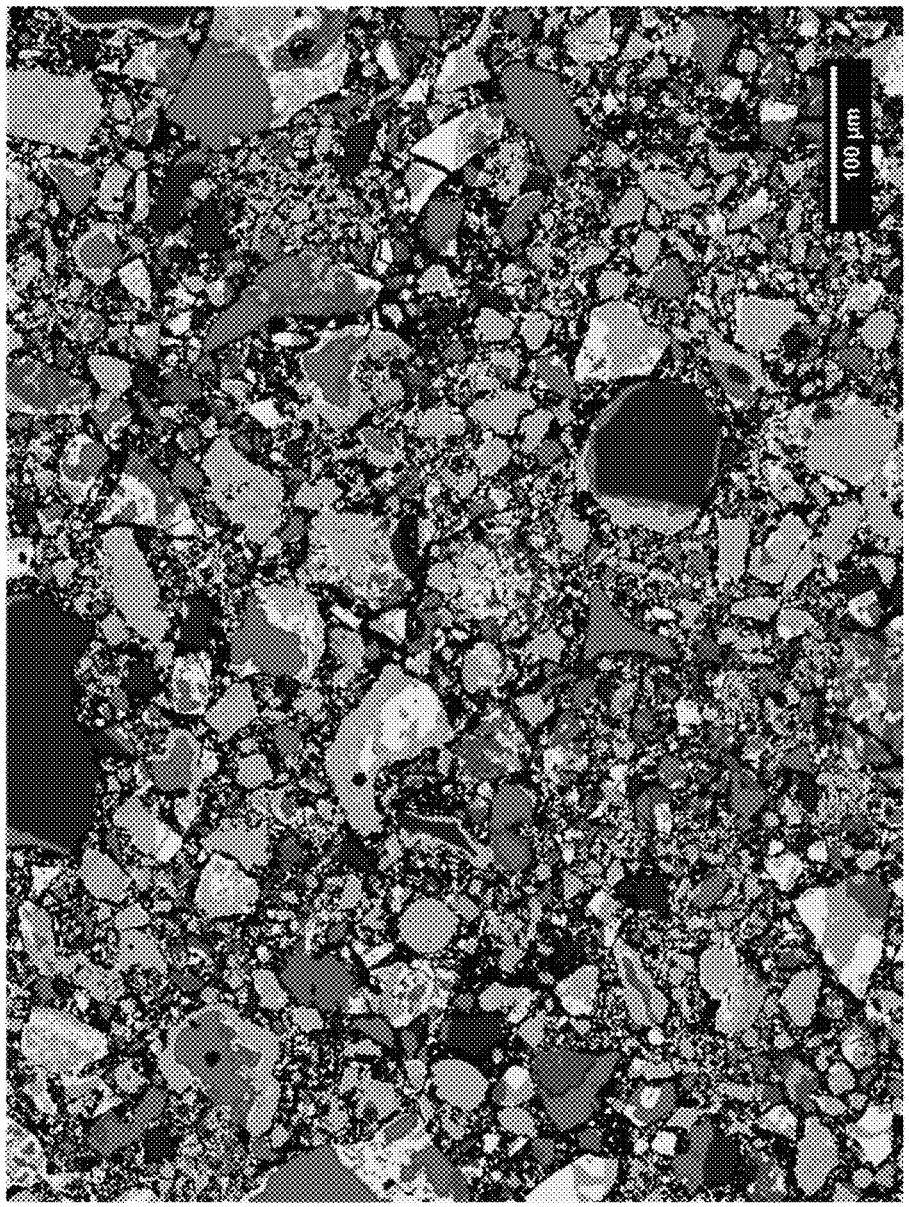
FIG. 7. False color composite micrograph depicting various particles of Experimental Cement 1. Single and multi-phase particles of many compositions are visible.
Figure 7:
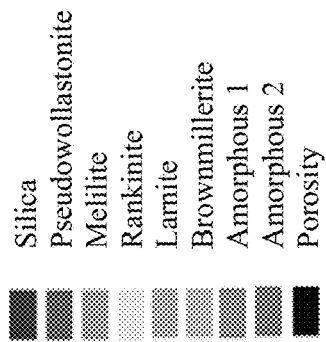

Experimental Cement 1 was subjected to a detailed survey by SEM in BSE mode in conjunction with X-Ray microprobe analysis. The elemental composition as measured by X-Ray microprobe was associated with the phases identified by XRD. The atomic composition of the phases as determined by X-Ray microprobe is shown in Table 5. This analysis identified an additional phase, brownmillerite or $Ca_2(Al,Fe)_2O_5$ as well as two distinct partially reactive amorphous phases: A low Al content amorphous phase, Phase 1, and a high Al content amorphous phase, Phase 2. In FIG. 6, FIG. 7, and FIG. 8 the compositional data collected in conjunction with the contrast of the phases as seen in BSE images was used to construct false-color maps of the unreacted particles. Numerous examples of multiphase particles of various classifications are observed.

TABLE 5

Atomic composition of phases in Experimental Cement 1 determined by X-Ray microprobe analysis. (Expressed as atomic %)

| Phase | O | Na | Mg | Al | Si | S | K | Ca | Ti | Mn | Fe |
|---|---|---|---|---|---|---|---|---|---|---|---|
| Wollastonite/ Psuedo-wollastonite | 59.5 | 0.0 | 0.0 | 0.6 | 18.7 | 0.0 | 0.3 | 20.8 | 0.1 | 0.0 | 0.1 |
| Rankinite | 58.0 | 0.0 | 0.2 | 0.4 | 15.8 | 0.0 | 0.1 | 25.5 | 0.0 | 0.0 | 0.0 |
| Belite | 56.8 | 0.0 | 0.1 | 0.6 | 13.3 | 0.0 | 0.2 | 28.8 | 0.0 | 0.0 | 0.1 |
| Amorphous (1) | 62.2 | 0.7 | 0.8 | 0.7 | 36.1 | 0.0 | 4.2 | 4.7 | 0.1 | 0.0 | 0.4 |
| Amorphous (2) | 60.0 | 0.8 | 0.4 | 9.3 | 18.8 | 0.0 | 6.3 | 4.1 | 0.0 | 0.0 | 0.1 |
| Brownmillerite | 55.9 | 0.0 | 0.7 | 7.0 | 3.3 | 0.4 | 0.3 | 23.9 | 0.4 | 0.1 | 8.0 |
| Melilite | 58.3 | 0.4 | 2.1 | 8.8 | 12.1 | 0.0 | 0.3 | 17.2 | 0 | 0 | 0.8 |
| Silica | 66.6 | 0.0 | 0.0 | 0.3 | 33.0 | 0.0 | 0.0 | 0.0 | 0.0 | 0.0 | 0.0 |
| Lime | 50.0 | 0.0 | 0.0 | 0.0 | 0.0 | 0.0 | 0.0 | 50.0 | 0.0 | 0.0 | 0.0 |

Figure 9:
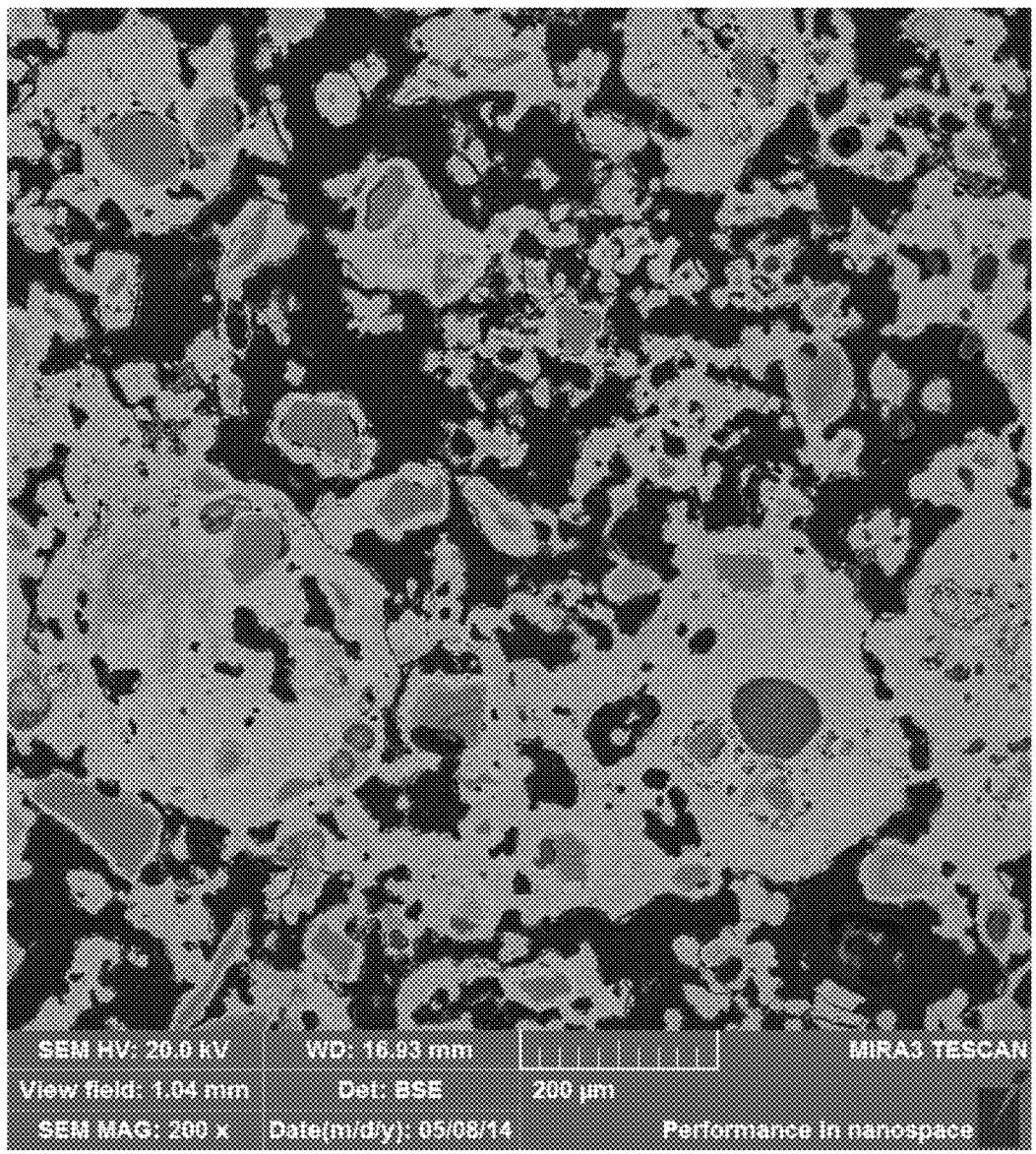
FIG. 9. A backscattered electron (BSE) Image of a cement clinker from Experimental Cement 2. Layers of low brightness unreactive silica banded by progressively brighter reactive phases are visible.
Figure 10:
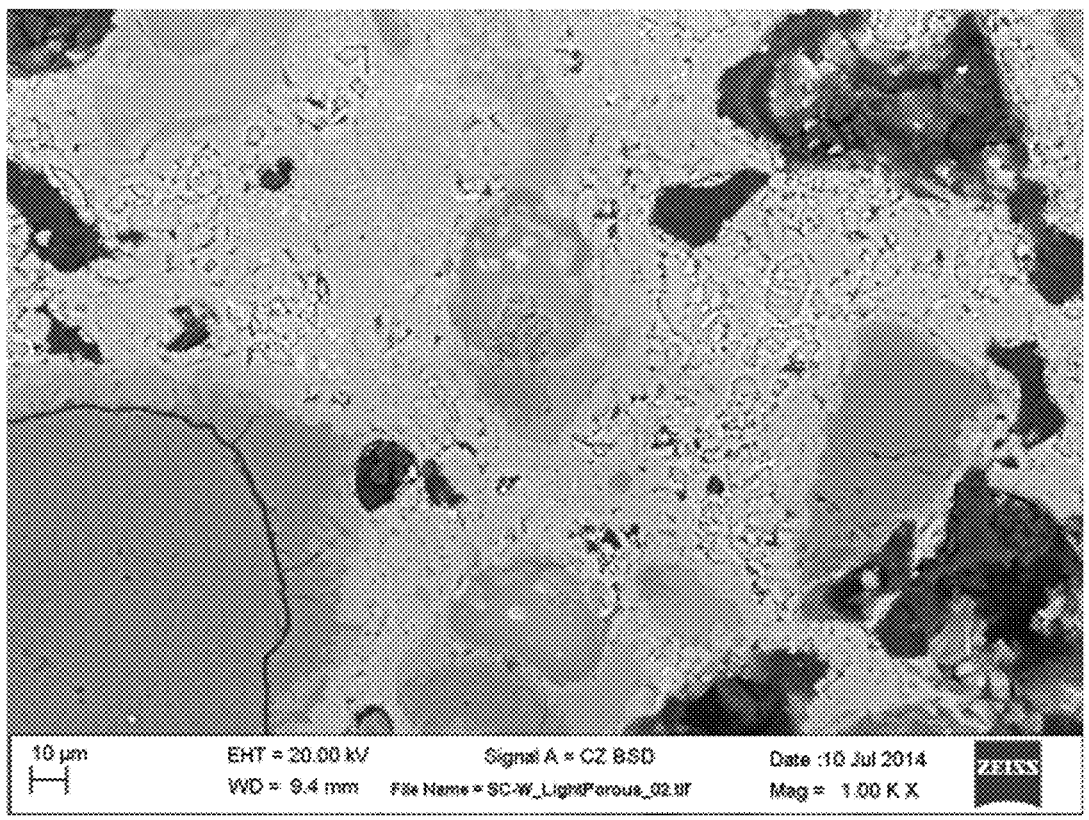
FIG. 10. A backscattered electron (BSE) Image of a cement clinker from Experimental Cement 2. Layers of low brightness unreactive silica banded by progressively brighter reactive phases are visible.
Figure 11:
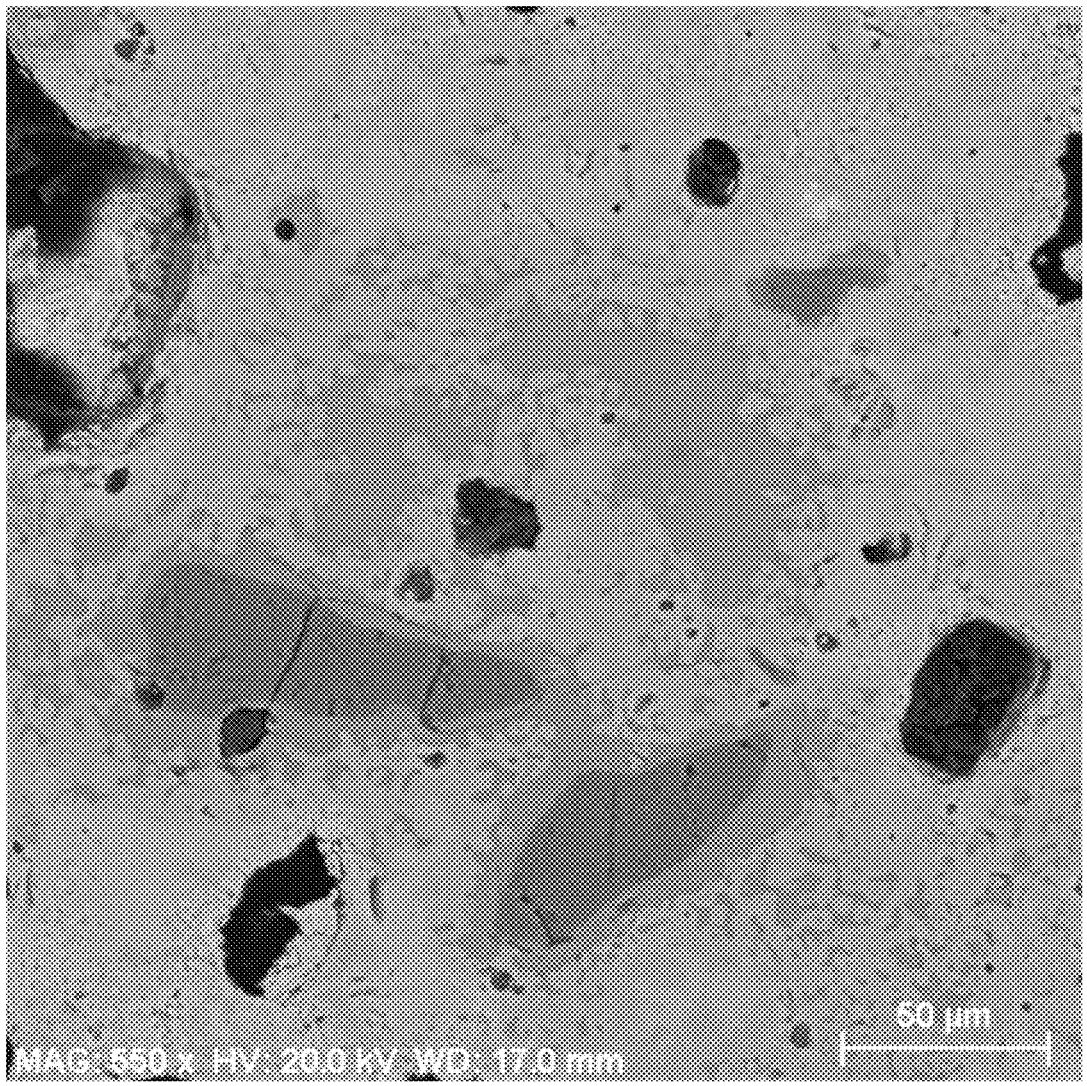
FIG. 11. A backscattered electron (BSE) image of a cement clinker from Experimental Cement 2.
Figure 12:
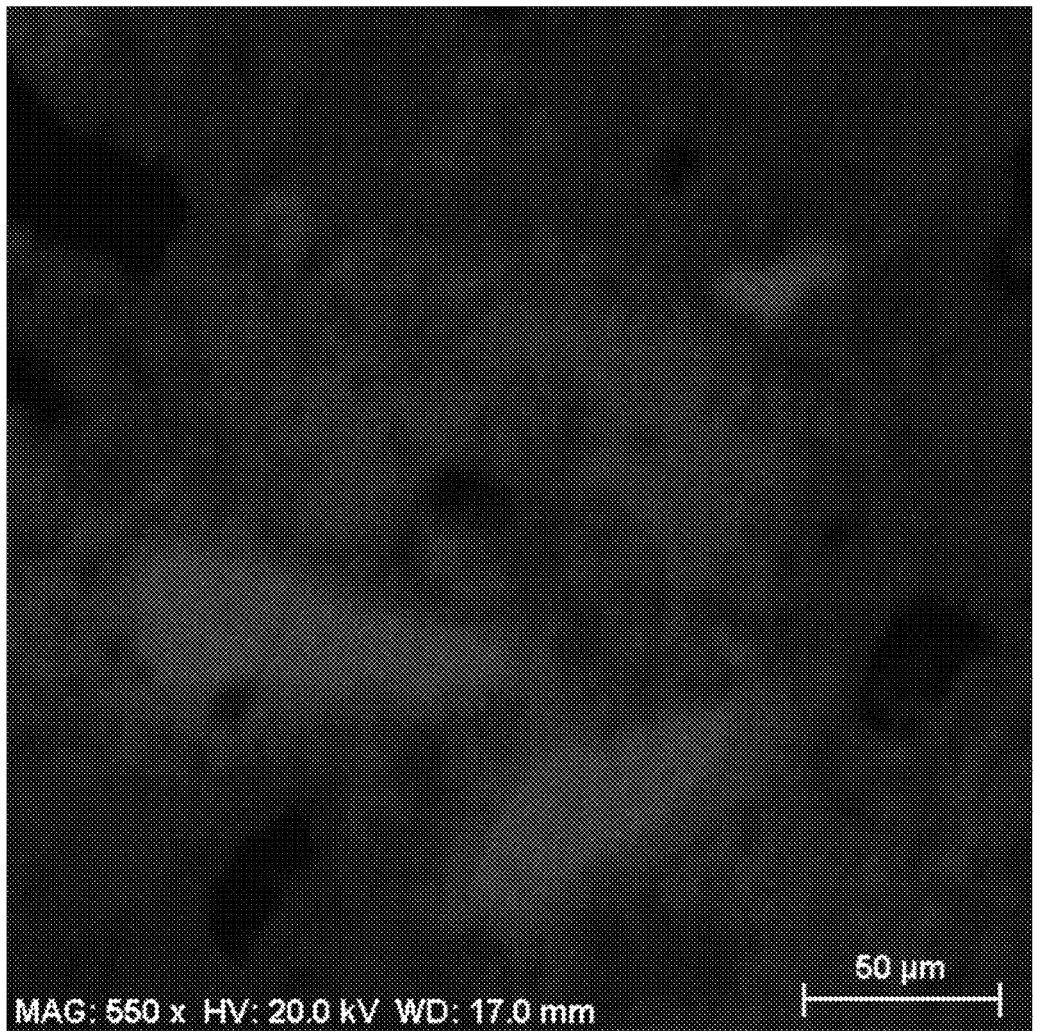
FIG. 12. An X-Ray map of FIG. 11 indicating the location of Si. The map indicates that the dark regions from FIG. 11 are rich in Si and that Si is less abundant at points distant from these areas.
Figure 13:
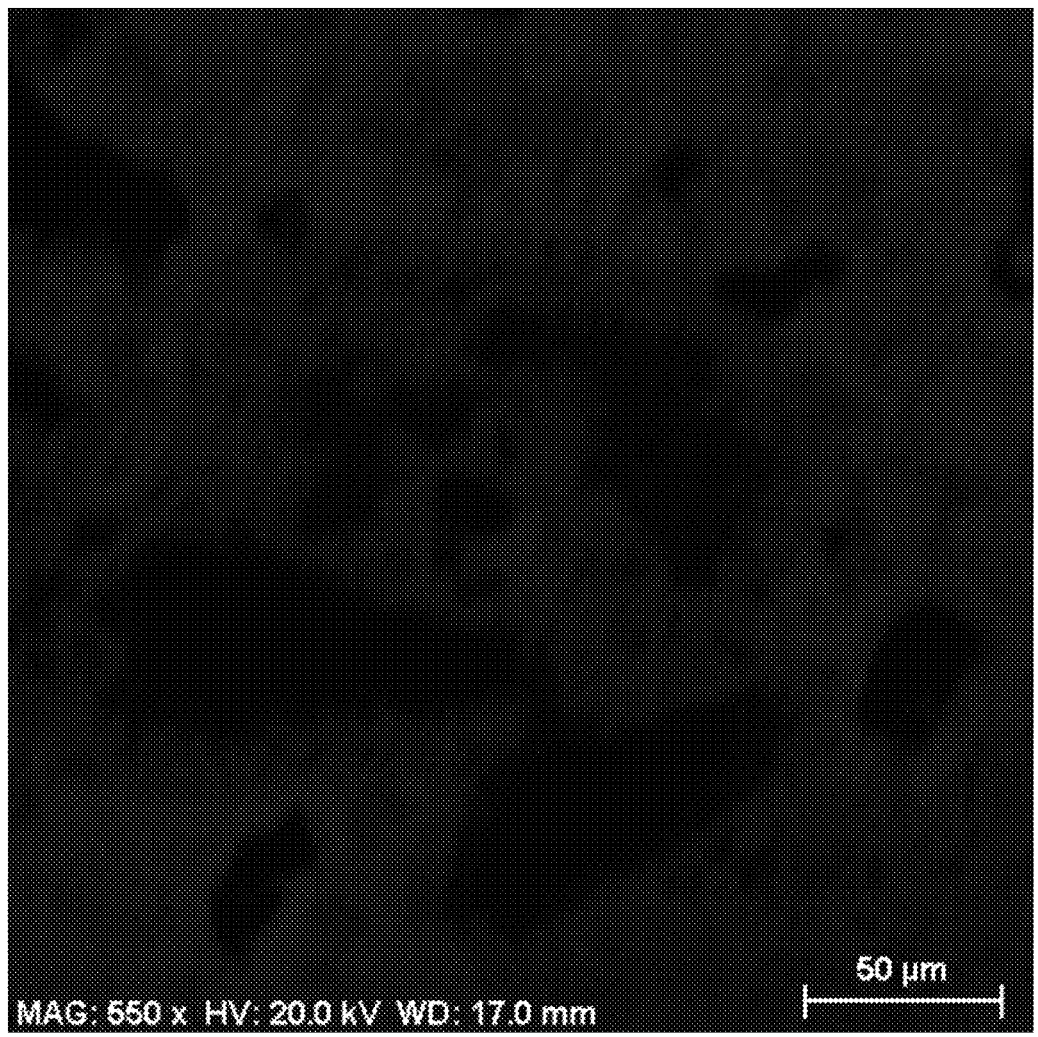
FIG. 13. An X-Ray map of FIG. 11 indicating the location of Ca. The map indicates that the abundance of Ca increases in distinct increments from the Si rich regions.
Figure 14:
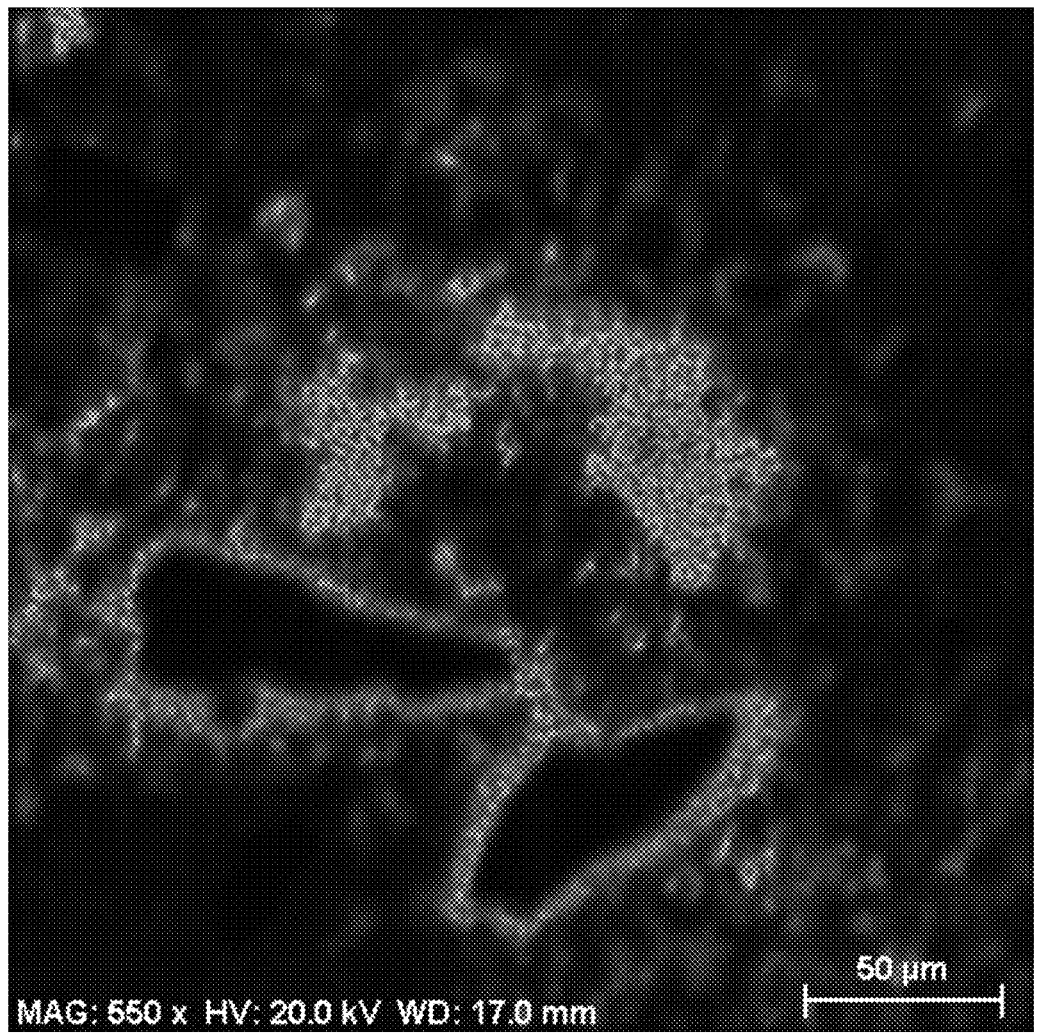
FIG. 14. An X-Ray map of potassium indicating that the potassium is concentrated around the edge of the silica particles.

A carbonatable calcium silicate was produced (Experimental Cement 2). To obtain the cement limestone and sand were ground to fineness of 85% passing 200 mesh. The limestone and sand were blended to obtain a bulk calcium to silicon atomic ratio of 1. The ground and blended raw material was processed in a rotary kiln to a peak temperature of approximately 1260° C. with a residence time of 30 to 60 minutes to react the powder and produce nodules of a sintered carbonatable calcium silicate cement clinker largely composed of carbonatable calcium silicates, melilites, an amorphous phase with a melilite-like composition and unreacted silica. The oxide composition of this cement as determined by XRF is shown in Table 6. The phase composition of this cement as measured by XRD is shown in Table 7. A polished clinker in FIG. 9, FIG. 10, and FIG. 11 shows discrete areas of a silica phase surround by a layered microstructure of increasing brightness reactive materials. In FIG. 12 and FIG. 13 elemental maps of Si and Ca are superimposed over FIG. 11 showing the change in Si and Ca content through the microstructure. In FIG. 14, an elemental map of K is superimposed over FIG. 11 showing that amorphous material with a characteristically high K content is present in between the Si rich core particle and Ca rich reactive phase layer.

TABLE 6

Oxide composition of Experimental Cement 2 as measured by XRF

| $SiO_2$ | CaO | $Al_2O_3$ | $Fe_2O_3$ | MgO | $SO_3$ | $K_2O$ | $Na_2O$ | $TiO_2$ | $P_2O_5$ | $Mn_2O_3$ |
|---|---|---|---|---|---|---|---|---|---|---|
| 43.8% | 42.9% | 6.0% | 2.5% | 2.0% | 1.0% | 1.1% | 0.1% | 0.3% | 0.2% | 0.1% |

TABLE 7

Phase composition of Experimental Cement 2 as measured by XRD

| Wollastonite $CasiO_3$ | Rankinite $Ca_3Si_2O_7$ | Belite $Ca_2SiO_4$ | Amorphous variable | Silica $SiO_2$ | Lime CaO | Melilites variable |
|---|---|---|---|---|---|---|
| 23% | 18% | 1% | 23% | 5% | 0% | 30% |

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples disclosed herein are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples included herein and the references to the scientific and patent literature cited herein. These examples contain important additional information, exemplification and guidance that can be adapted to the practice of this invention in its various embodiments and equivalents thereof.

What is claimed is:
1. A non-hydraulic clinker material, comprising
   particles of uncarbonatable silica ($SiO_2$), having diameters from about 0.1 μm to about 1,000 μm, dispersed in a matrix comprising at least one carbonatable calcium silicate phase, wherein the at least one carbonatable calcium silicate phase comprises at least one of wollastonite and pseudowollastonite and at least one of rankinite ($Ca_3Si_2O_7$) and belite ($Ca_2SiO_4$), and elemental Ca and elemental Si are present in the clinker at an atomic ratio from about 0.8 to about 1.2.

2. The clinker material of claim 1, further comprising:

an intermediate layer, comprising melilite (($Ca,Na,K)_2$ $(Al,Mg,Fe)[(Al,Si)SiO_7]$) and/or an amorphous phase and surrounding the particles of uncarbonatable silica.

3. The clinker material of claim 2, wherein the intermediate layer comprises an amorphous phase comprising one or more components selected from $Al_2O_3$, $Fe_2O_3$, MgO, $K_2O$ and $Na_2O$.

4. The clinker material of claim 3, wherein the matrix further comprises one or more components selected from $Al_2O_3$, $Fe_2O_3$, MgO, $K_2O$ and $Na_2O$.

5. The clinker material of claim 1, wherein the clinker is suitable for carbonation with $CO_2$ at a temperature of about 30° C. to about 90° C. to form $CaCO_3$, under an atmosphere of water and $CO_2$ having a pressure in the range from ambient atmospheric pressure to about 150 psi above ambient and having a $CO_2$ concentration ranging from about 10% to about 99% for about 1 hour to about 150 hours, with a mass gain of about 10% or more.

6. The clinker material of claim 5, wherein the clinker is suitable for carbonation with $CO_2$ at a temperature of about 40° C. to about 80° C. to form $CaCO_3$, under an atmosphere of water and $CO_2$ having a pressure in the range from ambient atmospheric pressure to about 40 psi above ambient and having a $CO_2$ concentration ranging from about 50% to about 95% for about 10 hour to about 50 hours, with a mass gain of about 10% or more.

7. The clinker material of claim 4, comprising about 30% or less of metal oxides of Al, Fe and Mg by total oxide mass.

8. A composite material produced by carbonation of a clinker material of claim 1.

9. A method for making a clinker material of claim 1, comprising:

mixing one or more precursors to obtain a blended precursor composition wherein elemental Ca and elemental Si are present at an atomic ratio from about 0.8 to about 1.2 and metal oxides of Al, Fe and Mg are present at about 30% or less by mass; and heating the blended precursor composition to a temperature between about 800° C. and about 1400° C. for a sufficient time to produce the clinker material.

10. The method of claim 9, wherein metal oxides of Al, Fe and Mg are present at about 10% or less by mass.

11. The method of claim 9, wherein the precursors are selected from limestone, sand, silts, sandstones, silica-rich clays and diatomaceous earths.

12. The method of claim 9, wherein the blended precursor composition is heated to a temperature between about 900° C. and about 1,300° C. for a sufficient time to produce the clinker material.

13. The method of claim 9, wherein the blended precursor composition is heated for a period of about 10 minutes hour to 5 hours.

14. The method of claim 9, wherein heating the blended precursor composition is conducted under atmospheric pressure.

15. A powdery material produced by grinding the clinker material of claim 1, wherein the powdery material is characterized by a mean particle size (d50) of about 8 μm to about 25 μm, with 10% of particles (d10) sized below about 0.1 μm to about 3 μm, and 90% of particles (d90) sized between about 30 μm to about 100 μm; and a surface at least 10% covered with the at least one carbonatable phase.

16. The powdery material of claim 15, wherein the particles comprise single-phase particles and multi-phase particles.

* * * * *